United States Patent [19]
Lizotte et al.

[11] Patent Number: 5,477,926
[45] Date of Patent: Dec. 26, 1995

[54] AGRICULTURAL IMPLEMENT FOR SEPARATING AND CRUSHING ROCKS

[75] Inventors: Marcel Lizotte; Philippe Gagnon, both of Riviere Verte, Canada

[73] Assignee: Maurice Michaud

[21] Appl. No.: 928,758

[22] Filed: Aug. 13, 1992

[51] Int. Cl.⁶ .................................................. A01B 43/00
[52] U.S. Cl. ............................ 171/15; 171/122; 171/128; 171/131
[58] Field of Search .................. 171/15, 63, 83, 171/122, 131, 128; 172/45, 47, 96; 56/14.4, DIG. 1

[56] References Cited

U.S. PATENT DOCUMENTS

| | | | |
|---|---|---|---|
| 1,462,096 | 7/1923 | Wiertz | 171/122 X |
| 2,027,840 | 1/1936 | Rodin | 171/15 |
| 2,447,399 | 8/1948 | Dey | 171/15 |
| 2,618,438 | 11/1952 | Chrystal | 241/81 |
| 3,540,534 | 11/1970 | Rhoads | 171/63 |
| 3,952,811 | 4/1976 | Carre | 172/45 |
| 4,417,627 | 11/1983 | Willibald | 172/45 |
| 4,449,673 | 5/1984 | Cameron | 241/186.35 |
| 4,848,682 | 7/1989 | Scheler | 241/190 |

FOREIGN PATENT DOCUMENTS

| | | | |
|---|---|---|---|
| 1071999 | 12/1959 | Germany | 171/131 |
| 3346895 | 7/1985 | Germany | 171/15 |

*Primary Examiner*—Randolph A. Reese
*Assistant Examiner*—Christopher J. Novosad

[57] ABSTRACT

An agricultural implement which may be pulled by a tractor in an agricultural field for improving soil conditions, provided with the capability to sort rocks according to their sizes whereby rocks of only desired dimension range are crushed, this implement consisting of a frame carried by two wheels, a drawbar assembly for attaching the frame to a tractor, a rock-transporting tilted belt conveyor assembly provided with a ploughshares means, a pair of corrugated crush rollers, a bin for collecting stones of large dimensions, and a hydraulic power system driven by a drive shaft connected to the power take-off of a tractor.

1 Claim, 3 Drawing Sheets

AGRICULTURAL IMPLEMENT FOR SEPARATING AND CRUSHING ROCKS

FIELD OF INVENTION

The present invention relates to an agricultural implement which may be pulled by a tractor in the farm field for the purpose of improving soil conditions by a mechanical process in which rocks of relatively small sizes are further reduced in size by crushing while rocks of larger dimensions are separated for collection and eventual disposal.

DISCUSSION OF PRIOR ARTS

Views on rocks found in agricultural fields have been changing historically. Until recently, rocks in the fields have been viewed only as a nuisance presenting particular difficulties to various mechanized farming operations.

Research findings of more recent days, however, indicate that the presence of rocks in the fields has some positive effects to the crop in terms of soil temperature and irrigation (Misener, McLeod and Wang, 1976). In right size and quantity, the rocks present in the field are known to help raise the soil temperature by functioning as a heat reservoir absorbing the solar energy during the day time and releasing it during the night time when the ambient temperature is low. Rocks present in the fields are also reported to help reduce surface runoff and soil erosion. Not all rocks, therefore, need to be removed from the field; only rocks of large dimensions need to be removed.

Willibald, in U.S. Pat. No. 4,417,627, disclosed an apparatus which utilized a work shaft with prongs and a rotatably driven drum on which flail-like parts are mounted whereby rocks lifted and pre-crushed by the rotary motion of prongs on the work shaft are broken by impact by the flail-like parts of the rotating drum. U.S. Pat. No. 3,952,811 issued to Carre shows another prior art in which rocks lifted up by the ploughshare means are crushed by hammers pivotally mounted around a rotor.

These prior art inventions were all intended for indiscriminate breaking of rocks in the fields regardless of their dimensions, and furthermore no means were provided to regulate the dimension of the rocks crushed or broken. Since high speed impact breaking is employed by both prior art inventions, one inevitable result thereof is the creation of rock dust which not only adversely affects the aeration of the soil but also causes changes in the pH value of the soil which was reported to be detrimental to crops (Chow, Rees, and Moodie). Use of rock crushers in stony agricultural fields will be therefore more promising if better soil/rock separation can be achieved during crushing.

OBJECTS OF THE PRESENT INVENTION

Accordingly, it is an object of the present invention to provide an equipment for breaking rocks in agricultural fields for the purpose of improving the soil condition.

It is another object of the present invention to provide a rock-crushing equipment capable of acting on rocks in the agricultural field in such a discriminate manner that rocks of relatively small dimensions are crushed while rocks of larger dimensions are separated and removed from the soil.

It is still another object of this invention to provide an efficient rock-crushing equipment provided with the capability to treat the soil in one single passing over the field without the need for repetition for obtaining better result.

In accordance with the present invention, rocks of small dimensions are crushed continuously by passing between a pair of rotating corrugated crush rollers, whereas rocks of larger dimensions are separated and collected for later disposal in a bin provided within the equipment.

In order that the objects of the invention may be better understood, an embodiment thereof will now be described, purely by way of illustration and example, with reference to the accompanying drawings.

DETAIL DESCRIPTION AND OPERATION

Figure 1:
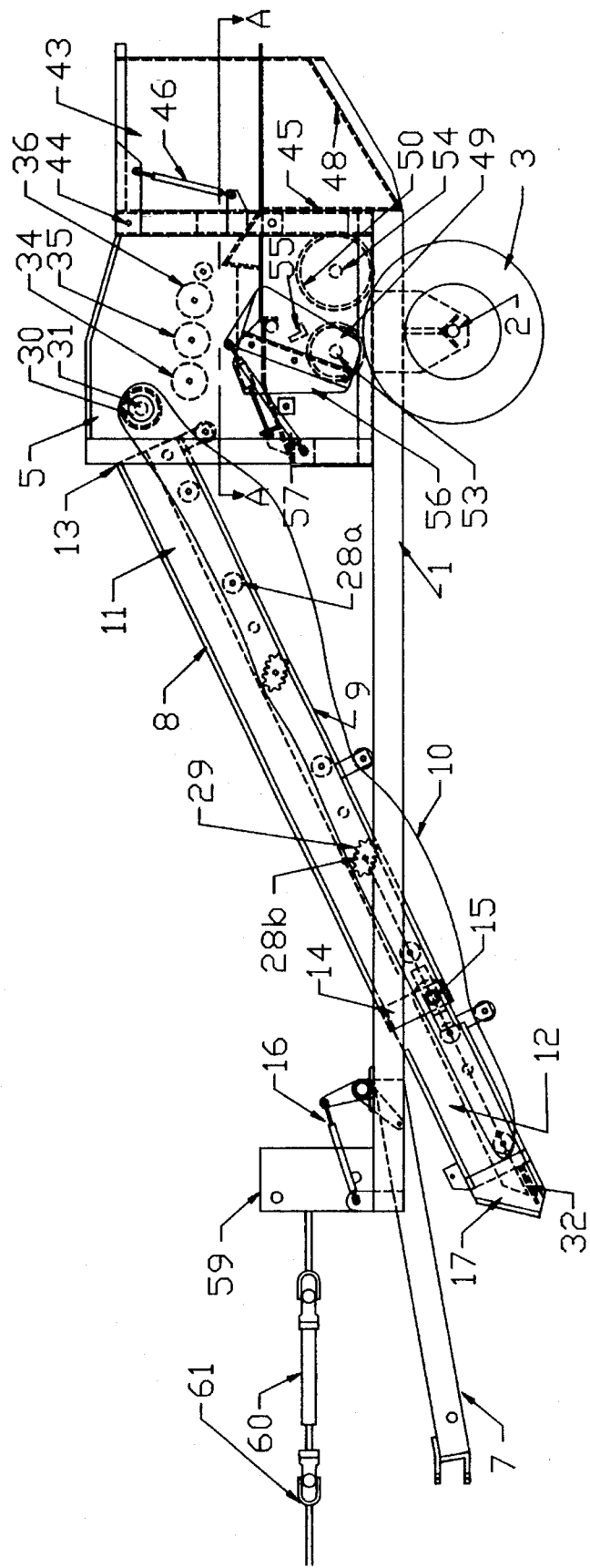
FIG. 1 is the side view of the equipment for separating and crushing rocks.

In FIG. 1, the equipment frame 1 is shown supported at its rear upon an axle 2. The axle 2, which is fixedly mounted under the frame in the transverse direction, is provided with a pair of pneumatic wheels, 3 and 4, rotatably mounted at either end thereof. Erected from the rear of the equipment frame 1 vertically in the upward direction is a pair of lateral plates 5 and 6 joined contiguously at their rear ends by a transverse plate generally at half the height of the pair of lateral plates 5 and 6, which is intended to support therebetween the arrangements necessary for performing screening and crushing of the rocks.

The equipment frame X consists essentially of a rectangular structure comprising two horizontally disposed longitudinal structural sections, 1a and 1b, interconnected by welded transverse members 1c, 1d and 1e. The said equipment frame 1 is provided at the front with a drawbar assembly 7 intended for connecting the equipment to a tractor. The drawbar assembly 7, generally of equilateral triangular configuration, consists of a pair of structural sections 7a, and 7b, of which one ends are fixedly attached to either side of the front of said equipment frame. The pair of structural sections, extending beyond the frontmost transverse bar of said equipment frame 1c, are joined together by the remaining ends thereof at the far front of said equipment frame, aligned with the equipment centerline. At the weld-jointed junction of these two structural sections, 7a and 7b, is provided a hitch 7c for coupling to a tractor by pin engagement.

The rock crusher equipment is provided with an assembly of tilted conveyor 8 consisting of a conveyor frame 9, a continuous web of belted chain 10, a plurality of support rollers, and a drive means. The frame 9 of said tilted conveyor is generally subdivided into two sections, i.e. the upper 11 and the lower 12 sections. The upper section 11 of said conveyor frame is fixed in relation to said equipment frame 1 in such a way that the rear end 13 that is raised is fixedly mounted between and across the top front portions of said pair of lateral plates 5 and 6, and the front end thereof 14 that is lowered in relation to said rear end is fixedly mounted onto said equipment frame 1, whereby formed is a tilted conveyor surface extending upwardly from the front end 14 to the rear end 13 of said upper section 11 of said conveyor frame 9. The lower section 12 is pivotedly engaged at 15 to the front end 14 of said upper section 11, extending contiguously and downwardly therefrom generally to the ground level. At 16, a hydraulically operated actuator is provided as a means for regulating the tilted angle of the lower section 12. The vertical position of the front end tip 17 of said lower section 12 is thereby adjusted to a desired depth into the ground.

On the inside of both side plates 11, 12, 18 and 19, and also on both sides of a longitudinal bar 20 that is disposed along the centerline of the equipment in parallel with said side plates, the conveyor frame 9 is provided with a plurality of rotatably mounted support rollers 28a and 28b, whereupon a continuous web of belted chain be is supported by its upper portion with the remaining portion hanging thereunder. Supported movably along the tilted surface of said conveyor frame 9, the continuous web of belted chain be consists of a plurality of transverse bars 21 fixedly attached at both ends, 22 and 23, and also at the centre 24 thereof along the outer circumferential surface of a continuous longitudinally-running belts 25, 26 and 27 at a spacing therebetween large enough to let drop therethrough as a way of prescreening soils and undersized stones for which crushing operation is unnecessary.

The said plurality of support rollers includes at least a set of four eccentrically shaped rollers 28b disposed in axial alignment with one another. These eccentrically shaped rollers are provided on the circumference thereof with gear-like teeth 29 of which the pitch matches the spacing between said transverse bars 2. In operation of the conveyor belt 8, this eccentrically shaped rollers 28b are intended to cause vibratory movement in said web of belted chain 10 in the direction perpendicular to that of the movement of said belted chain for the purpose of assisting in the downward ejection of undersized stones and soils onto the ground, thereby pre-excluding them from further processing towards the eventual crushing operation.

The tilted conveyor assembly 8 is complete with a hydraulic motor drive that is provided at 30 in axial alignment with the conveyor shaft 31 at a location that is the upper end of the range of the conveyor.

At the lowermost end of the lower section of said conveyor frame 17 is positioned a ploughshare means 32. The ploughshare means 32 consists of a plate 33 disposed transversely across the width of said conveyor frame at such an angle of attack as to effect, in its working position, continuous shovelling upwardly of the ground to a selected depth as said equipment is drawn forward in the normal direction of movement. In operation, stones, rocks and soils which are ploughed up from the ground by said ploughshare means 33 are transferred upwardly in the rearward direction onto said web of belted chain 10 which carries them thereafter along the upwardly tilted conveyor surface. In this process, soils and undersized stones are dropped back onto the ground through the openings that exist in said web of belted chain thereby pre-excluding them from further processing. The vibratory movement of the surface of the belted chain caused by the eccentrically shaped rollers 28b offers assistance to this pre-screening operation.

Figure 2:
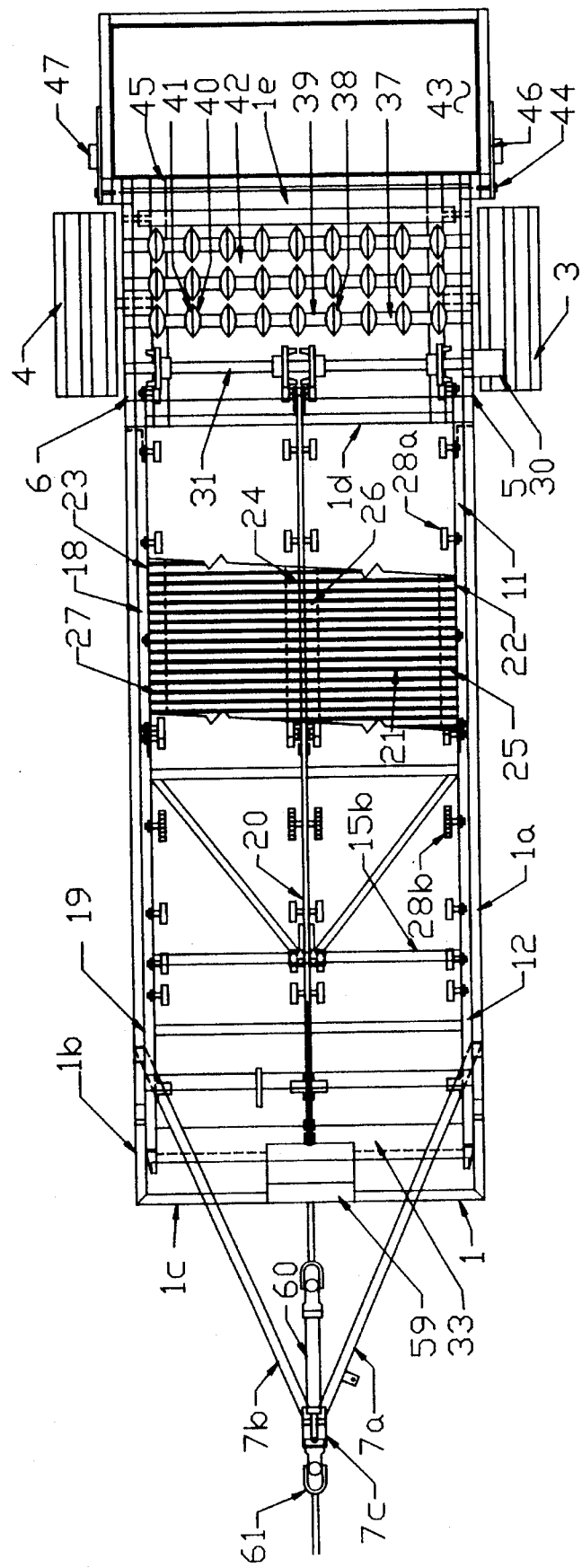
FIG. 2 is the plan view of the equipment of which the side view is shown in FIG. 1.
Figure 4:
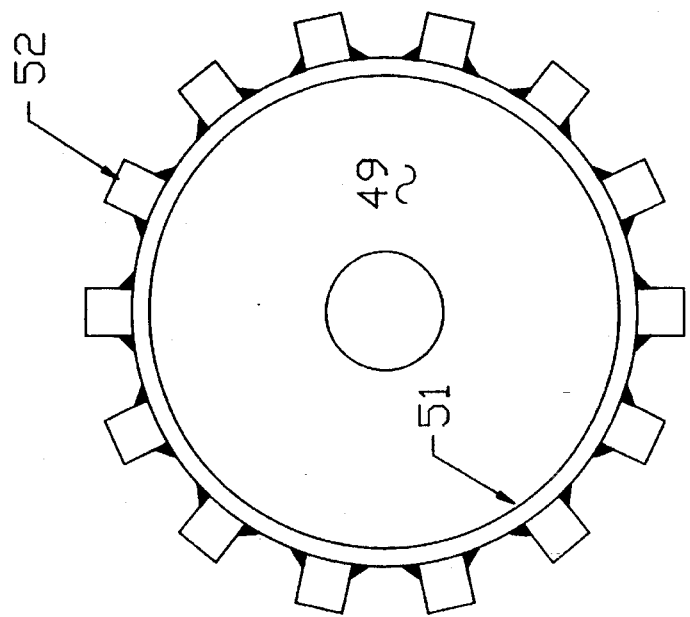
FIG. 4 is the cross-sectional view of the corrugated crush roller along the line B—B in FIG. 3.

In FIG. 1 and 2, a plurality of disced shafts 34 are shown rotatably mounted between said pair of lateral plates 5 and 6. These disced shafts are disposed transversely in relation to said equipment frame 1. The first 34 of this series of disced shafts is positioned just below and directly behind the discharging end of said belted chain conveyor 10, the second 35 and the rest thereof being positioned progressively downwardly and rearwardly at a horizontal spacing that is even but sufficiently small not to allow to drop therethrough stones and rocks of certain size or larger.

Each of the plurality of disced shafts consists of a shaft 37, a series of circular discs 38 carried through their centres by said shaft, and spacer rings 39 by which said circular discs are separated by a fixed distance. Each of said circular discs is constructed of two identical conical-shape pieces 40 and 41 formed from a circular steel blank plate that is provided with a round hole at its center for fitting onto said shaft. Two of said identical pieces are joined together, bottom-to-bottom, and welded at the joint that extends around the circumference, thereby forming a disc of which the thickness progressively reduces in the radial direction until tapered to nil at the maximum radius of the disc.

A chain drive connected to the hydraulic motor 30 drives said plurality of disced shafts in the direction the same as that of said web of belted chain 10 to permit objects discharged from the conveyor to continue to move in the reward direction. In this process, stones of certain size and smaller can make their downward way through the openings 42 of the arrangement of said plurality of disced shafts 37 for the crushing operation that follows. All oversized stones and rocks not dropped therethrough, however, are urged by the rotary movement of said disced shafts to continue to move in the rearward and generally horizontal direction until the entrance to the storage bin 43 that is provided immediately behind the last disced shaft is reached.

The storage bin 43, constructed of steel plates, generally consists of a rectangular box with open top and open front wall. To the equipment frame, the storage bin is rotatably engaged by a pivot 44 provided at the upper front thereof. In the normally closed position, the storage bin is held against the plate 45 erecting vertically from the rear end of the equipment frame 1, whereby the front wall of the storage bin is partially closed generally up to the half of its height. The upper half of the front opening of the storage bin 43, however, always remains open serving as the entrance for the stones thereinto. When the storage bin 43 is filled to capacity, the pair of hydraulic cylinders 46 and 47 provided on both sides of said storage bin are actuated to effect the rotation of the storage bin around the pivot 44, thereby making the opening at the front available for discharging rocks therethrough. To assist in this dumping operation, the bottom of the storage bin 48 is sloped forwardly.

Figure 3:
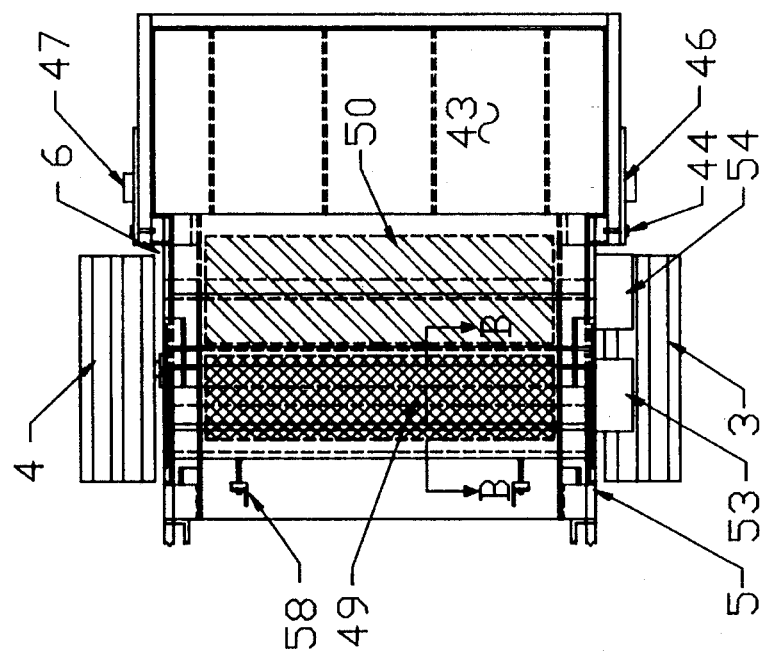
FIG. 3 is the cross-sectional top view along the A—A line in FIG. 1, showing the pair of corrugated crush rollers.

In FIG. 3, a pair of corrugated crush rollers 49 and 50 are shown dispositioned transversely in relation to said equipment frame 1 between the pair of lateral plates 5 and 6 directly below the arrangement of said plurality of disced shafts 34 through 36. Each of said pair of corrugated rollers, 49 and 50 comprises a round roller 51 which is provided around the circumferential surface thereof a plurality of teeth 52. Each of said teeth 52 consists of a highly rigid steel bar of substantially square cross-section, running continuously in parallel with the axis of said round roller. Said pair of corrugated rollers are intended for crushing into smaller dimension therebetween stones and rocks of certain size or smaller as were screened by said arrangement of disced shafts that is located directly thereabove. Each of said corrugated rollers is provided with an independent hydraulic motor, 53 and 54, and are driven in the opposite direction to each other so that at their closest point circumferential surfaces of both corrugated rollers are moving in the same downward direction. Stones and rocks that come between said pair of corrugated rollers from above are therefore crushed while urged downwardly. The maximum dimension of the crushed stones outcoming from said pair of corrugated rollers can be regulated by means of adjusting the clearance therebetween. 55 is the regulating member which is pivotable about an axis parallel to the axis of the rotors.

Also shown in FIG. 1 is the hydraulic pump means 56 which is provided with a longitudinal drive shaft 57. The drive shaft 57, provided at its front end with a coupling means 58 for connection to the power take-off of a farm tractor, acts to impart a rapid rotary movement of a tractor to a hydraulic pump, whereby hydraulic power that is necessary in the operation of the rock crusher equipment is generated within the equipment itself. This feature is intended to avoid overheating the tractor's hydraulic system as may happen when the hydraulic power is taken therefrom.

The embodiments of the invention in which an exclusive property or privilege is claimed are defined as follows:

1. An equipment for breaking rocks found in agricultural fields, comprising in combination:
   A) an equipment frame of which a rear end is supported upon a plurality of wheels rotatably mounted thereunder, provided with a pair of lateral plates erected on opposing sides of said rear end of said equipment frame, said pair of lateral plates joined contiguously at their rear ends by a transverse plate generally of half the height of said pair of lateral plates;
      a) said transverse plate generally covering the lower half of the space between said lateral plates;
   B) a drawbar assembly provided at a front of said equipment frame thereby connecting said equipment to a tractor;
   C) a tilted conveyor assembly consisting of a conveyor frame, a continuous web of belted chain, a plurality of support rollers, and a drive means;
      a) said conveyor frame subdivided into an upper section and a lower section;
         i) said upper section fixedly mounted in relation to said equipment frame in such a way that a rear end of said upper section is raised and fixedly mounted between and across top front portions of said pair of lateral plates while a front end of said upper section is lower in relation to said rear end of said upper section and is fixedly mounted onto said equipment frame;
         ii) said lower section pivotally engaged to said lower front end of said upper section, extending contiguously and downwardly therefrom generally to ground level;
         iii) means provided for regulating an angle of tilt of said lower section of said conveyor assembly, whereby a vertical position of a front end tip of said lower section can be adjusted to a desired depth into the ground;
         iv) said conveyor frame, on which said plurality of support rollers are rotatably mounted, supporting thereupon said continuous web of belted chain which slides in a longitudinal direction generally from front to rear of said equipment;
      b) said continuous web of belted chain consisting of a plurality of cylindrical transverse bars rigidly attached at their ends and also at their centers to continuous belts;
      c) said cylindrical transverse bars being spaced from each other to define a spacing therebetween large enough to let through soils and undersized stones for which a crushing operation would be unnecessary;
      d) said plurality of support rollers including eccentrically-shaped rollers provided with gear-like prongs of pitch to match said spacing between said cylindrical transverse bars, intended to cause vibratory movements in the web of belted chain in a direction perpendicular to that of the sliding direction of belted chain assisting in the screening of undersized stones and soils for pre-exclusion from crushing operation that follows;
      e) said web of belted chain is driven in an upward and rearward direction by said drive means;
   D) a ploughshare means positioned immediately in front of said tip of said lower section of said conveyor frame, consisting of a plate lying transversely across the width of said conveyor frame at such an angle of attack as to effect continuous shovelling up of the ground to a selected depth as the equipment is set to a working position and pulled forward in a normal direction of movement, whereby stones, rocks and soils picked up from the ground are moved upwardly onto said web of belted chain for transportation along said conveyor frame, whereby soils and undersized stones are dropped back onto the ground through openings that exist in the web of belted chain thereby excluding said soils and undersized stones from further processing;
   E) a plurality of disced shafts rotatably mounted in series between said pair of lateral plates transversely in relation to said equipment frame, wherein a first of said plurality of disced shafts is positioned directly behind and below an upper discharging end of said tilted conveyor assembly wherein a second and a remainder of said plurality of disced shafts being positioned progressively rearwardly and downwardly from said upper discharging end of said tilted conveyor assembly at an even horizontal spacing sufficiently small not to let drop through stones and rocks of certain size;
   F) a power means for driving said disced shafts in a direction that is generally the same as that of said web of belted chain, whereby, while stones of certain size and smaller may be dropped downward through spacings between said plurality of disced shafts for a crushing operation that follows, all oversized stones and rocks that remain are carried by rotary movement of the disced shafts horizontally until a storage bin that is provided immediately behind the last of said plurality of said disced shafts is reached, each of said disced shafts comprising
      a) a shaft, lying transversely in relation to said frame, said shaft carrying a series of circular discs through the center thereof, separated by spacer rings, the thickness of the discs decreasing progressively and symmetrically in a radial direction until tapering to zero at their circumference;
      b) said storage bin consisting of a box with an open top and an open front wall, held against said transverse plate of the equipment, adapted to be detached for eventual disposal of accumulated rocks and stones;
   G) a pair of corrugated crush rollers lying transversely in relation to the equipment frame between the pair of lateral plates directly below said plurality of disced shafts, each comprising a roller provided with a plurality of prongs of high rigidity around the circumferential surface thereof, said pair of corrugated crush rollers intended for crushing the stones and rocks dropped from said plurality of disced shafts;
      a) each of said corrugated crush rollers being powered by a hydraulic motor; and
   H) a hydraulic pump means which transforms rotary movement transmitted from the tractor through a power take-off into hydraulic power necessary for operation of the equipment.

\* \* \* \* \*